US011173819B2

(12) United States Patent
Koller et al.

(10) Patent No.: US 11,173,819 B2
(45) Date of Patent: Nov. 16, 2021

(54) SELF-ADJUSTING CENTRE CONSOLE WITH ARM DETECTION

(71) Applicant: MOTHERSON INNOVATIONS COMPANY LIMITED, London (GB)

(72) Inventors: Matthias Koller, Stuttgart (DE); Andreas Herrmann, Stuttgart (DE); Ilka Rötzer, Denkendorf (DE)

(73) Assignee: Motherson Innovations Company Limited, London (GB)

( * ) Notice: Subject to any disclaimer, the term of this patent is extended or adjusted under 35 U.S.C. 154(b) by 286 days.

(21) Appl. No.: 16/448,989

(22) Filed: Jun. 21, 2019

(65) Prior Publication Data
US 2019/0389352 A1    Dec. 26, 2019

(30) Foreign Application Priority Data

Jun. 22, 2018 (DE) .......................... 102018115134.9

(51) Int. Cl.
*B60N 2/75* (2018.01)
*B60R 16/037* (2006.01)
*G06K 9/00* (2006.01)

(52) U.S. Cl.
CPC .............. *B60N 2/77* (2018.02); *B60N 2/773* (2018.02); *B60N 2/793* (2018.02); *B60R 16/037* (2013.01); *G06K 9/00375* (2013.01)

(58) Field of Classification Search
CPC .......... B60N 2/77; B60N 2/773; B60N 2/763; B60N 2/793; B60R 16/037; G06K 9/00375
See application file for complete search history.

(56) References Cited

U.S. PATENT DOCUMENTS

| 5,585,625 A * | 12/1996 | Spies ...................... G01S 17/04 250/221 |
| 6,523,417 B1 * | 2/2003 | Donahue .............. B60N 2/0224 250/221 |
| 9,481,466 B2 * | 11/2016 | Fischer ................ B64D 11/064 |

(Continued)

FOREIGN PATENT DOCUMENTS

| DE | 102007033532 A1 | 1/2009 |
| DE | 102008018458 A1 | 10/2009 |

(Continued)

OTHER PUBLICATIONS

German Office Action dated Mar. 8, 2019 of the priority application DE 10 2018 115 134.9.

*Primary Examiner* — Philip F Gabler
(74) *Attorney, Agent, or Firm* — Jones Day (57) ABSTRACT

A method for setting an ergonomic position of a center console with an arm rest and with one or more operating elements separate from the arm rest in a vehicle, includes detecting an arm of a driver facing the centre console with a forearm and at least areas of an upper arm using one or more optical sensors; determining at least an elbow position and a hand position of the arm of the driver using sensor data of the sensors by means of a suitable evaluation method; and automatically moving the arm rest of the centre console using the positioning unit based on the determined elbow positions and hand positions at least vertical as well as parallel to the vehicle axis so that after moving an ergonomic position of the arm is achieved.

23 Claims, 6 Drawing Sheets

(56) References Cited

U.S. PATENT DOCUMENTS

| | | | | |
|---|---|---|---|---|
| 2010/0295349 | A1* | 11/2010 | Schaal | B60N 2/832 297/216.12 |
| 2017/0080825 | A1* | 3/2017 | Bonk | G01D 5/34746 |
| 2017/0101032 | A1* | 4/2017 | Sugioka | B60Q 3/80 |

FOREIGN PATENT DOCUMENTS

| | | |
|---|---|---|
| DE | 102014117101 A1 | 5/2016 |
| DE | 102016004758 A1 | 9/2016 |

* cited by examiner

SELF-ADJUSTING CENTRE CONSOLE WITH ARM DETECTION

CROSS-REFERENCE TO RELATED APPLICATION

This application claim the benefit of foreign priority to German Patent Application No. DE 10 2018 115 134.9, filed Jun. 22, 2018, which is hereby incorporated by reference in its entirety for all purposes.

BACKGROUND

1. Field of the Invention

The present disclosure related to a method for setting, with regard to the arm of a respective driver, an ergonomic position of a centre console, at least with a movable arm rest, and to a vehicle with such a centre console.

2. Related Art

Vehicles have, as a part of the dashboard, a centre console which is arranged approximately at knee height between the two front foot areas, and which extends up to the position of the arm support between the front seats or functions as an arm support itself. Here, the centre console is essentially used for comfort operating and display elements, such as ventilation, air conditioning unit, car radio or navigation system, and can further comprise the gear lever and hand brake handle, depending on the type of vehicle. For convenient operation of the respective elements, the position of the centre console is adjustable in some vehicle types.

Currently known systems for the arrangement of the centre console in the interior of the vehicle can, however, only provide defined positions in relation to the driving mode. These positions are adjusted ex works or individually and can if necessary be approached using a so-called memory function. In one embodiment, the movement of the centre console is coupled with that of the vehicle seat, wherein an electric motor adjusts the centre console to the position of the driver's seat, if the driver changes the position of the driver's seat. However, the positions thus achieved only cover a small portion of the positions required in reality for different inmates with different sizes and body proportions and preferences. As a result, an ergonomically optimal position is only rarely achieved. Typically, the prepared position must be manually post-adjusted in order to find an improved position.

It would therefore be desirable to have a centre console available in a vehicle with which an ergonomic position of the centre console can easily and reliably be set for any driver with any size and body proportions.

SUMMARY

In one aspect, a method for setting, with regard to the arm of a respective driver, an ergonomic position of a centre console with an arm rest and with one or more operating elements separate from the arm rest in a vehicle, wherein at least the arm rest is movably mounted, by means of a positioning unit, at least vertically as well as parallel to a vehicle axis, includes the following steps:

detecting an arm of the driver facing the centre console with the forearm and at least areas of the upper arm by means of one or more optical sensors;

determining at least an elbow position and a hand position of the arm of the driver using sensor data of the sensors by means of a suitable evaluation method; and automatic moving of the arm rest of the centre console by means of the positioning unit based on the determined elbow positions and hand positions at least vertically as well as parallel to the vehicle axis such that, after moving, an ergonomic position of the arm is achieved.

The purpose of ergonomics is to provide easy and convenient to use devices and apparatuses. The term "ergonomic position" refers in the present invention to a position and posture of the arm that enables an efficient and as accurate as possible operation of the operating elements (user interface components or human-machine interfaces) of the centre console, while protecting the driver (and if necessary also the front passenger) from damage to health, including longer journeys with the vehicle. In the ergonomic position, the arm of the driver is sufficiently supported by the arm rest, which is provided by a suitable elbow position of the arm, and through an evenly optimized position of the hand, convenient operation of the operating elements (human-machine interface) in the centre console is enabled, when these lie within reach of the hand and thus in the area of the hand, without the arm having to be moved for the purpose. The movement, at least of the arm rest, performed with the method according to the invention can be achieved both in a horizontal movement parallel to the vehicle axis of the vehicle as well as vertically. Here, the longitudinal axis of the vehicle in the direction of driving is the vehicle axis. The vertical direction is the direction that lies vertical to the vehicle floor (and thus also vertical to the vehicle axis). Thus, an ergonomic position of the arm can already be achieved through a movement along two axes that stand vertical to each other, of which one is the vertical axis. In other embodiments, the movement can also be performed using suitable positioning units, along three axes that stand vertical to each other. The movement along the axes can be performed separately in succession or as a combined movement along several axes at the same time. In order to be able to set an ergonomic position of the arm, at least of the driver, at least the arm rest must itself be movable along the above axes. Here, in some embodiments, however, additional areas of the centre console can also be moved together with the arm rest, wherein the additional areas do not necessarily have to make the same movement as the arm rest. The automatic moving at least of the arm rest can be performed at the start of the journey or when changes are made to the vehicle interior, such as seat adjustment, steering wheel adjustment, mirror adjustment or adjustment of the headrests.

Every unit for the movement of a component along at least two separate axes can be used as a positioning unit. The longitudinal movement and/or vertical movement of the arm rest can in this case be achieved e.g. via rails, rollers, cable pull, belt or sliding, wherein for this purpose, the positioning unit drives the movement e.g. hydraulically, pneumatically or electrically by means of a telescope drive, a spindle drive, an electric motor, SMA actors or in another manner. The positioning unit can for example be arranged in the arm rest or in other areas of the centre console and triggered accordingly with control impulses from the control unit for the execution of the desired movement.

The optical sensors can comprise all types of sensor with which objects can be optically detected in their dimensions and positions. The one or more optical sensors are arranged at suitable positions in the vehicle interior for detecting the arm of the driver (and/or if necessary, of the front passenger). For example, the optical sensors can be integrated in front of the driver or front passenger in the vehicle headliner (inner side of the vehicle roof), in the rear-view mirror or in the dashboard. The one or more optical sensors could, however, also be arranged alone or additionally in the side areas of the vehicle interior, such as in the driver's door, above the centre console or integrated in the centre console. For the optical detection of the arm, the optical sensors must in this case be arranged in such a way that, from their position, they have an at least in large parts clear view of the arm positioned on the centre console. In addition to detecting the arm, the optical sensors can also be used for other purposes, such as detecting gestures to control the method according to the invention, or the vehicle equipped accordingly. For example, so-called ToF cameras or a dual camera system can be used as optical sensors. Here, a ToF camera or a dual camera system can be used alone or in combination with each other. The one or more optical sensors used in the method according to the invention or in the vehicle according to the invention are suitably connected with a control unit via data lines (wired, or wireless), so that the optical sensors can transfer sensor data to the control unit for evaluation by the control unit. With a wired connection, the data lines to the optical sensors can be integrated in the wire harness of the vehicle. With a wireless connection, the optical sensor(s) can for example be connected to the control unit via WiFi or Bluetooth or another near-field communication technology. With the evaluation method, the sensor data is evaluated in such a way that at least one elbow position and one hand position of the detected arm can be determined in order to be able to move the arm rest to optimize these positions relative to the operating elements on the centre console and the upper body of the driver to attain an ergonomic position of the arm automatically, without further action by the driver, and thus effectively and purposefully. The control unit can here be equipped with a data storage and a processor for performing the evaluation method in the form of an evaluation program. Additionally, one or more predetermined positions of the centre console or arm rest can be stored in the data storage. These predetermined positions can for example be set individually for the respective driver on the basis of other measured parameters, such as the weight of the driver after sitting down in the driver's seat, in order to then move the arm rest according to the method according to the invention into an ergonomic position, on the basis of the predetermined settings for the position of the arm rest, provided this has not already been achieved by the preset position. For the further execution of the method according to the invention, the control unit is also connected at least with the positioning unit and if necessary with other components in the vehicle and in the centre console via suitable data lines (wire-supported or wireless).

Thus, the method according to the invention enables an adjustment (movement) of the centre console with which an ergonomic position of the centre console can be easily and reliably set for any driver with any size and body proportions, in particular through the automatic adjustment, without inconvenient manual actions by the driver.

In one embodiment, the ergonomic position is achieved when the elbow rests on the arm support of the centre console and the hand is situated in the area of the operating elements of the centre console. When the elbow is resting on the arm rest, the arm is sufficiently supported, so that no or only very slowly fatigue of the arm occurs. If the hand is situated in the area of the operating elements at the same time, these can be operated from a comfortable position of the arm without physical effort, which prevents the driver from becoming tired or being distracted from monitoring the traffic (eyes searching for the operating elements).

In a further embodiment, the optical sensors comprise one or more ToF cameras. A ToF camera (or Time-of-Flight camera) is a 3D camera system that measures distances using the time of flight method. For this purpose, the cameras can comprise a PMD sensor for capturing the respective images. With the ToF method, the scene, in this case the arm in its position in the area of the centre console, is illuminated using a light pulse, wherein the camera measures the time for each image point that the light requires until it reaches the object (such as a part of the arm, a part of the arm rest or the centre console) and returns back. The required time is proportional to the distance. The camera thus provides the distances of the object displayed for each image point, from which the distance between certain objects can be determined. A ToF camera can be used at a distance range of several decimetres to several meters, and is therefore suitable for the usual dimensions in a vehicle interior. Additionally, ToF cameras offer a distance resolution of approx. 1 cm and a lateral resolution of up to 200×200 pixels, which is sufficient for the purpose of arm detection. The high frame rate enables fast re adjustment when moving the arm rest. With ToF cameras, the arm and certain points such as the elbow or hand can be determined sufficiently precisely and reliably for the execution of the method according to the invention.

In one embodiment in which the evaluation method for determining the elbow position is based on sensor data from a ToF camera, said evaluation method comprises the following steps:
  determining a distance from the arm rest to the arm along the vehicle axis as an x-coordinate;
  detecting an x-coordinate with maximum change of slope in a function of the distance via the x-coordinate as the first x-coordinate; and
  associating the first x-coordinate with the position of the elbow.

The distance between the arm rest and the forearm is the respective vertical distance between the arm rest and the arm for a plurality of different points along the arm from the hand up to the end of the area of the arm above the arm rest that can be seen by the ToF camera. This vertical distance results from the previously determined distance of the image pixels to the ToF camera with the corresponding trigonometric evaluation. These distances are entered as a function of the position along the arm rest, here described as the x-coordinate. In the area of the forearm, the distance is usually small, and only fluctuates slightly along the forearm, while the distance on the other side of the elbow along the upper arm becomes continuously larger. The elbow is the transition point from the small slope to the large slope in distance, so that on the elbow, the largest change of the slope for this function (distance over the position or x-coordinate) emerges. Accordingly, this x-coordinate is associated with the elbow position. This type of evaluation is easy to perform and delivers sufficiently reliable results for moving the arm rest.

In a further embodiment, the evaluation method for determining the hand position using the ToF camera comprises the following steps:
  measuring a length at least of the forearm including the hand; and
  estimating the hand position from the measured length and a predetermined length ratio between the forearm and the hand.

With a determined elbow position, it is thus established for the image data that the part of the arm between the hand and the elbow position corresponds to the forearm. With the corresponding trigonometric evaluation, the length of the forearm, including the hand, follows from the previously determined distance of the image pixels for the foremost point of the hand and elbow position in relation to the ToF camera. Based on the stored data for the usual length ratios between the forearm and the hand, this can be used to precisely determine the hand position, based upon which the arm rest is moved such that the hand is then located in the area of the operating elements, so that the operating elements are then within reach of the hand without the forearm or the entire arm having to be removed from the arm rest. This type of evaluation is easy to perform and delivers sufficiently reliable results for moving the arm rest.

In a further embodiment, the optical sensors comprise a dual camera system, wherein the dual camera system comprises two cameras arranged close to each other for capturing three-dimensional spatial data.

In this case, the term "camera" relates to lenses, so that a dual camera system according to the invention can also consists of a shared housing with two lenses arranged close to each other. When triggered, the two cameras (individual cameras or two lenses in a shared housing) enable the simultaneous capturing of the two stereoscopic fields required for the 3D images. The light exposure control and focus setting of both cameras or lenses are coupled. In order to guarantee a spatially accurate display, the two cameras or lenses are usually separated by a distance of 60-70 mm (base), which approximately corresponds to the distance between the eyes. Cameras or lenses for dual camera systems have sufficient depth of field and a sufficient resolution in order to reliably detect an arm in the vehicle and to be able to determine its position sufficiently precisely for the execution of the method according to the invention.

In one embodiment in which the evaluation method for determining the elbow and hand position is based on sensor data from a dual camera system, said evaluation method comprises the following steps:
  capturing at least of the wrist and the elbow, preferably also the shoulder, as reference points;
  determining depth information by means of displacing the reference points in different images captured by the dual camera system; and
  calculating positions of the reference points in relation to the arm rest (21) of the centre console using a predetermined coordinate system at least as the elbow position and hand position.

This type of evaluation is easy to perform and delivers sufficiently reliable results for moving the arm rest. As soon as the elbow is detected, the corresponding point serves as a reference point. The same applies to the wrist or other characteristic points on the body. Here, the dual camera system is for example re-calibrated for new drivers, when the seat position is changed and/or on request, for example via a manual triggering of the calibration. During calibration the corresponding reference point is determined from several photographs of vehicle interior with the driver.

In a further embodiment, the step of moving the arm rest on the centre console comprises the following steps:
  Moving the arm rest first parallel to the vehicle axis into the corresponding position below the arm so that the hand is in the area of the operating elements when the arm rests on the arm rest; and
  then moving the arm rest in the vertical direction until the forearm rests on the arm rest.

Through the movement initially performed along the vehicle axis, the hand is first positioned in order to then set the correct position for the elbow for this position. Through the separate movement along just one axis each, the ergonomic position can be reliably achieved and the movement can also be dynamically more easily controlled by the optical sensors, since it is only performed along one axis in each case.

In a further embodiment, the moving of the arm rest is performed parallel to the vehicle axis in the lower vertical limit stop of the arm rest.

In this case, the term "limit stop" refers to the end point of the possible movement of the centre console or arm rest along this axis. The movement in the lower limit stop prevents the arm from being over-extended during the movement along the vehicle axis as a result of a vertical position of the arm rest that may have been set too high.

In a further embodiment, the step of moving the arm rest in the vertical direction upwards by means of a pressure sensor and a corresponding control unit is ended as soon as a contact pressure of the arm exceeds a predetermined threshold value. The exceeding of a specified contact pressure corresponds to a too high setting of the arm rest and thus to a position of the arm that is no longer ergonomic. For this reason, a monitoring of the contact pressure is a particularly suitable control parameter in order to prevent the arm rest from adopted a position for the arm that is no longer ergonomically optimal. This threshold value can for example be stored in the data storage facility of the control unit. In a preferred embodiment, the threshold value lies between 10N and 50N.

In a further embodiment, the step of automatic moving is only performed after a predetermined minimum resting time of the forearm has been exceeded. This minimum resting time can in one preferred embodiment be 3 seconds, for example. As a result of the minimum resting time at the start of the method according to the invention, the arm rest is prevented from immediately being moved with a random positioning of the arm on the arm rest or on the centre console, although the arm is perhaps not intended to rest on the arm rest at all. Thus, unnecessary disturbances to the driver in the vehicle interior and increased wear on the centre console and other components is avoided.

In a further embodiment, the step of automatic moving is initiated by a certain action of the driver or another vehicle passenger comprising a gesture, an operation of a switch or a button. This action of the driver can for example be detected by the optical sensors and the control unit can be triggered accordingly. Actions such as gestures make operation easier, as no possibly small buttons must be targetedly operated, and thus the driver is less strongly distracted from monitoring the traffic.

In a preferred embodiment, the thus initiated moving comprises the following steps:
  moving the arm rest into a lower vertical limit stop;
  holding the arm at a desired height; and
  moving the arm rest upwards in the vertical direction until the elbow rests on the arm rest.

This gesture can be easily made by the driver without a loss of attention and is easily detectable by the optical sensors, so that the method according to the invention can be reliably started.

In a further embodiment, the method is deactivatable from the vehicle interior. Thus, the method can simply be suppressed if it is not desired.

In a further embodiment, during the step of moving in the vehicle, a warning message is displayed or a warning tone is emitted. In this way, possible injury to the driver by the method (e.g. jamming of the arm or fingers) is prevented.

In a further embodiment, the arm rest of the centre console is an arm rest that is divided into a first arm rest on the driver's side and a second arm rest on the front passenger's side, wherein the method is performed independently both for setting the ergonomic arm position for the driver and for the front passenger. As a result, the same level of convenience is available to the front passenger as to the driver. Here, all the embodiments described above can also be implemented and performed for the second arm rest. In particular, the one or more optical sensors can also be arranged on or in the front passenger door.

The invention further relates to a vehicle comprising a centre console with an arm rest for resting an arm of a driver and with one or more operating elements separate from the arm rest, wherein at least the arm rest is movably mounted, by means of a positioning unit, at least vertically and also parallel to a vehicle axis, one or more optical sensors for detecting the arm of the driver facing the centre console with the forearm and at least areas of the upper arm and a control unit connected to the optical sensors and the positioning unit via data lines, which is configured to perform a method according to the invention via corresponding triggering of the positioning unit.

For this purpose, the control unit can comprise at least one data storage and at least one processor. In order to realize the method, an evaluation method for determining at least one elbow position and a hand position of the arm of the driver is performed using sensor data from the sensors on the control unit. The control unit performs an automatic moving of the arm rest of the centre console by means of the positioning unit based on the determined elbow positions and hand positions in the vertical and horizontal direction such that after movement an ergonomic position of the arm is achieved.

In this case, the term "vehicle" refers to all types of vehicle that have a centre console and an arm rest. Such vehicles can for example be land vehicles, water vehicles or aeroplanes.

Thus, the vehicle according to the invention enables an adjustment (movement) of the centre console with which an ergonomic position of the centre console can be easily and reliably set for any driver with any size and body proportions.

In one embodiment of the vehicle, here, the optical sensors comprise one or more ToF cameras and/or one or more dual camera systems.

In a further embodiment of the vehicle, at least the ToF camera and/or the dual camera system is arranged in a side door of the vehicle. Here, the side door is both the driver's door and the front passenger's door. The side view onto the arm of the driver (or of the passenger) on the arm rest on the centre console enables a particularly precise detection of the arm and certain points such as the elbow position and hand position, and thus enables a particularly precise setting of an ergonomic position of the arm rest for the arm.

In a further embodiment of the vehicle, a pressure sensor is integrated in the arm rest in order to determine whether a contact pressure of the arm exceeds a predetermined threshold value. Preferably, the threshold value is between 10N and 50N. Here, the detector can be arranged on any suitable point for the purpose in the centre console or arm rest.

In a further embodiment of the vehicle, at least one of the optical sensors is configured and suitably arranged to detect certain actions of the driver or another vehicle passenger.

In a further embodiment of the vehicle, the dashboard and/or the centre console or other areas in the vehicle suitable for operation are configured to deactivate the moving of the arm rest and/or to display a warning message in the vehicle or to emit a warning tone during moving of the arm rest. The deactivation can for example be performed by pressing a corresponding button or actuating a corresponding switch. The warning tone can be emitted by a suitable loudspeaker, for example via an audio system of the vehicle.

In a further embodiment of the vehicle, at least the arm rest of the centre console is a two-part arm rest that is divided into a first arm rest on the driver's side and a second arm rest on the front passenger side, in order to also offer the comfort provided to the driver to the passenger, wherein the first and second arm rest can be moved independently of each other by the positioning unit and the control unit is configured to be able to set the ergonomic arm position both for the driver and for the front passenger, independently of each other.

The embodiments listed above can be used individually or in any combination with each other for the design of the device according to the invention and of the method.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art.

Also, descriptions of well-known functions and constructions may be omitted for increased clarity and conciseness.

Figure 1:
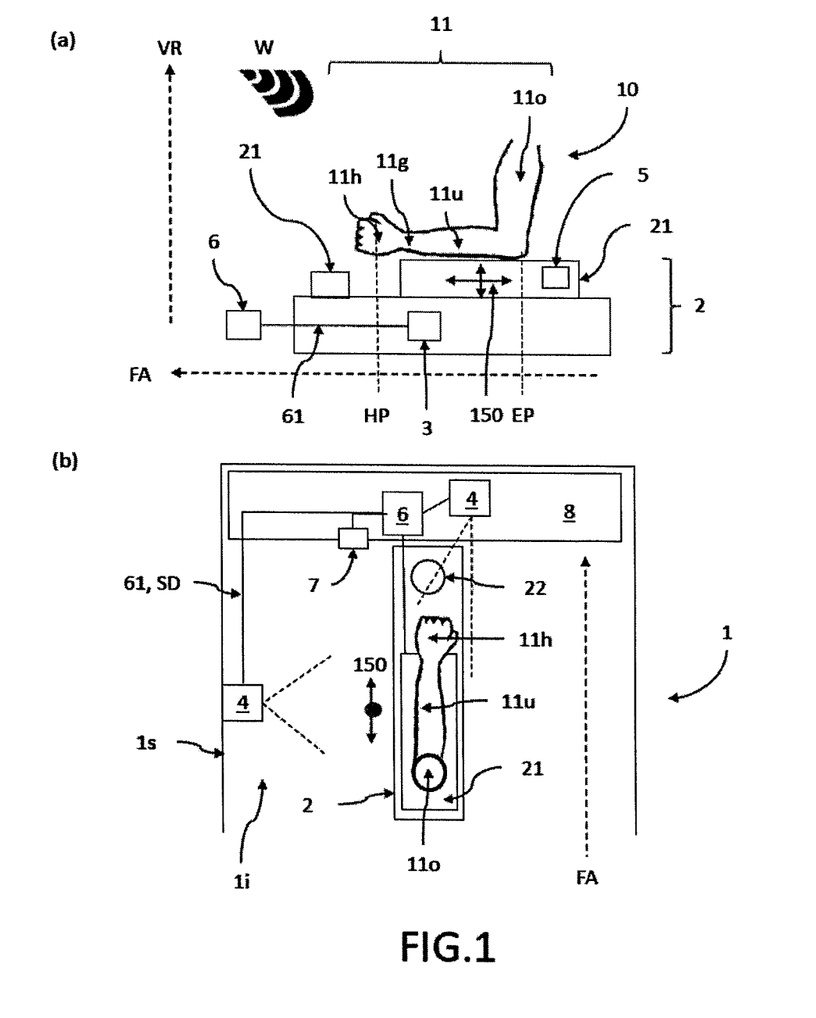
FIG. 1 shows a schematic drawing of an embodiment of the vehicle according to the invention with movable arm rest of the centre console (a) in a side view and (b) in a top view.

FIG. 1 shows a schematic drawing of an embodiment of the vehicle 1 according to the invention with movable arm rest 21 of the centre console 2 (*a*) in a side view and (b) in a top view. Alongside the arm rest 21 for resting an arm 11 of a driver 10 (not displayed in detail here for reasons of clarity, instead only indicated via the arm 11), the centre console 2 comprises and with one or more operating elements 22 separate from the arm rest 21, said arm rest being movably mounted, by means of a positioning unit 3 arranged below the arm rest 21, along two separate axes (indicated by intersecting arrows) both vertically and parallel to the vehicle axis FA (see dotted axes). Depending on the embodiment, the positioning unit 3 can also be arranged in other positions in the area of the centre console 2. Further, here, two optical sensors 4 for the detection of the arm 11 of the driver 10 facing towards the centre console 2 with the forearm 11*u* and at least areas of the upper arm 11*o* are arranged on the side door is of the driver and in the interior 1*i* in the centre in the dashboard 8, wherein these optical sensors 4 and the positioning unit 3 are connected via wired data lines 61 with the control unit 6, which is configured to perform the method according to the invention as displayed in FIGS. 3 to 6, in order to be able to achieve an ergonomic position of the arm through adequate setting of the position of the arm rest. The optical sensor 4 in the side door is can depending on the embodiment be a ToF camera 41 and a dual camera system 42 for detecting and measuring the arm 11. The optical sensor 4 on the dashboard 4 can for example be provided in order to recognise gestures or other actions of the driver 10 (or other vehicle passengers) for initiating the movement of the arm rest 21. Further, here in the rear part of the arm rest 21 a pressure sensor 5 is integrated to determine whether a contact pressure AD of the arm 11 exceeds a predetermined threshold value SW, wherein the threshold value SW is here preset in the range between 10N and 50N. The dashboard 8 further comprises a switch 7 via which the movement 150 of the arm rest 21 can be deactivated. Further, during the moving 150 of the arm rest 21 in the vehicle, a warning message can be displayed or a warning tone W can be emitted, for example via the audio system (not displayed explicitly) of the vehicle 1.

Figure 2:
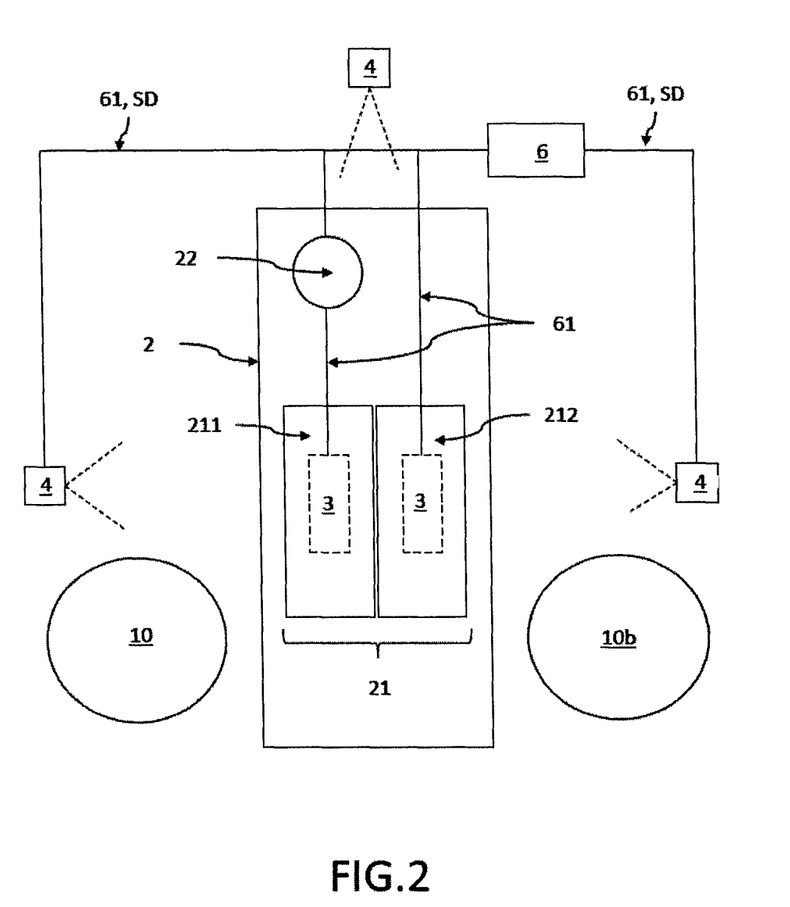
FIG. 2 shows a schematic view of another embodiment of the vehicle according to the invention with separately movable two-part arm rest on the centre console.

FIG. 2 shows a schematic view of another embodiment of the vehicle 1 according to the invention with separately movable two-part arm rest 21 on the centre console 2. Here, the arm rest 21 is divided into a first arm rest 211 on the driver's side and a second arm rest 212 on the front passenger side, wherein both arm rests 211, 212 can be moved independently of each other from a respective positioning unit 3 for the respective arm rest 211, 212 and the control unit 6 can set the ergonomic arm position ER for the driver 10 and for the front passenger 10*b* independently of each other. For all other components displayed here, reference is made to the description accompanying FIG. 1.

Figure 3:
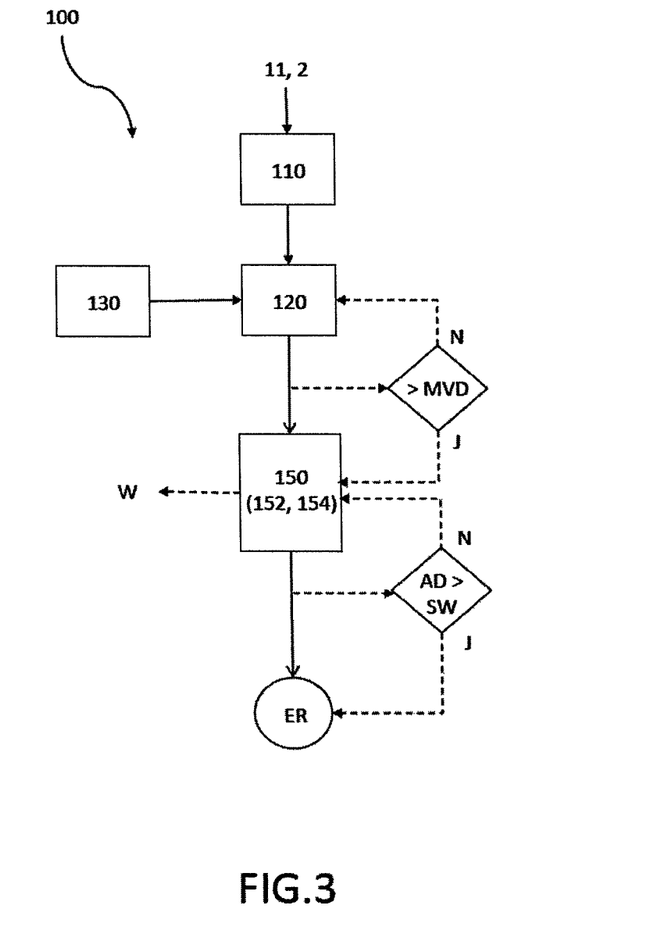
FIG. 3 shows a schematic view of an embodiment of the method according to the invention for setting an arm-related ergonomic position of the centre console with automatically movable arm rest.

FIG. 3 shows a schematic view of an embodiment of the method 100 according to the invention for setting an arm-related ergonomic position of a centre console 2 with an automatically movable arm rest 21 and with one or more operating elements 22 separate from the arm rest 21 in a vehicle 1, wherein the arm rest 21 is movably mounted by means of a positioning unit 3 vertical as well as parallel to a vehicle axis FA. The method 100 according to the invention here comprises the steps of detecting 110 an arm 11 of the driver 10 facing the centre console with the forearm 11*u* and at least areas of the upper arm 110 by means of one or more optical sensors 4; determining 120 at least an elbow position EP and a hand position HP of the arm 11 of the driver 10 using sensor data SD of the sensors 4 by means of a suitable evaluation method 130; and automatic moving 150 of the arm rest 21 of the centre console 2 by means of the positioning unit 3 based on the determined elbow positions EP and hand positions HP at least vertical as well as parallel to the vehicle axis FA such that after moving 140 an ergonomic position ER of the arm 11 is achieved, where the elbow 11*e* rests on the arm rest 21 of the centre console 2 and the hand 11*h* is in the area of the operating elements 22 of the centre console 2.

The step of moving 150 the arm rest 21 can here be performed as a movement 150 along two separate axes in succession, wherein first, a moving 152 of the arm rest 21 parallel to the vehicle axis FA into the corresponding position below the arm 11 (so that the hand 11*h* is located in the area of the operating elements 22 when the arm 11 is resting on the arm rest 21) and then 154 in the vertical direction VR (until the forearm 11*u* rests on the arm rest 21) is performed. Here, the arm rest 21 can be moved in the lower vertical limit stop of the arm rest 21 along the vehicle axis. Here, the step of automatic moving 150 can only be performed after a predetermined minimum resting time MVD of the forearm 11*u* on the arm rest 21 has been exceeded. If the arm 11 remains on the arm rest 21 for less than the minimum resting time MVD, the arm 11 continues to be recognised by the optical sensors 4, although without a movement 150 of the arm rest 21 being performed. In order to avoid exceeding an optimal height of the arm rest 21, the moving 150 of the arm rest 21 in the vertical direction VR upwards by means of a pressure sensor 5 and a corresponding control unit 6 is ended as soon as a contact pressure AD of the arm 11 exceeds a predetermined threshold value SW. If this threshold value SW has not yet been exceeded and the ergonomic position of the arm 11 has not yet been reached, the vertical movement 150 of the arm rest 21 is continued upwards. Here, during moving 150 in the vehicle 1, a warning message can be displayed or a warning tone W can be emitted. The method 100 can be deactivated from the vehicle interior 1*i*.

Figure 4:
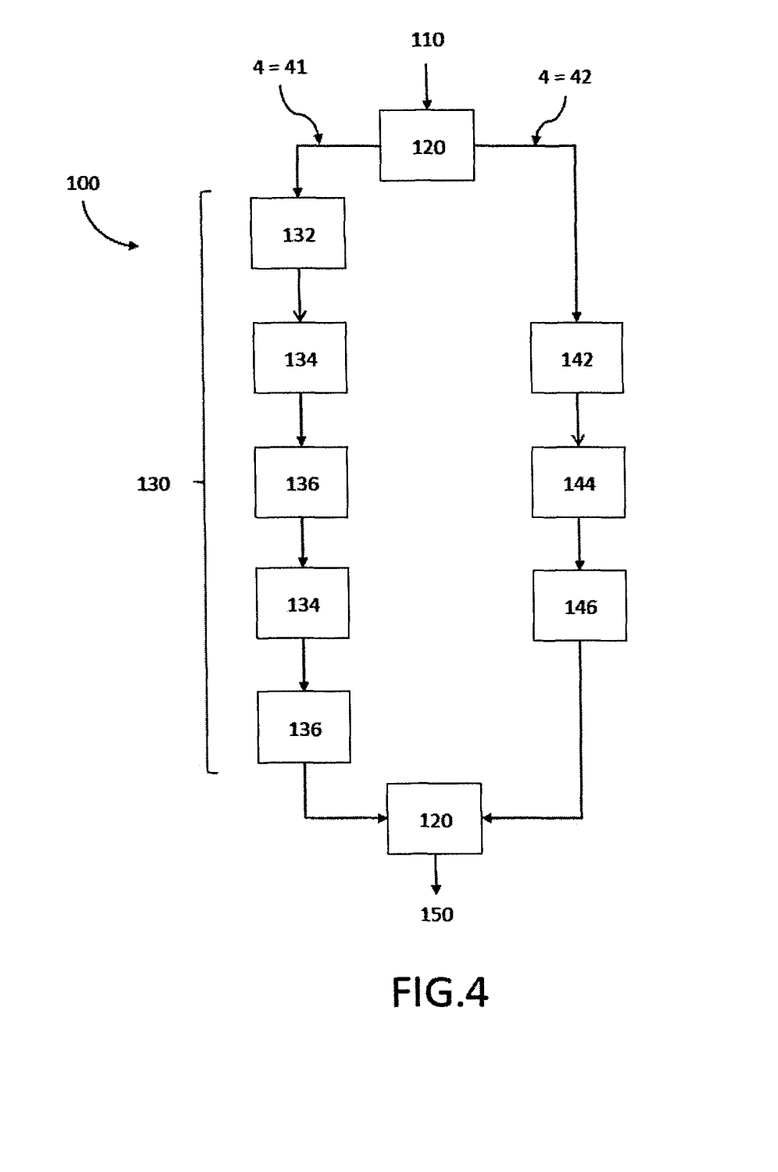
FIG. 4 shows a schematic view of two embodiments of the method according to the invention with different evaluation methods for determining elbow and hand positions.

FIG. 4 shows a schematic view of two embodiments of the method 100 according to the invention with different evaluation methods 130 for determining elbow and hand positions EP, HP, where in the left branch the optical sensor 4 is a ToF camera 41 and in the right branch the optical sensor is a dual camera system 42. Accordingly, the respective evaluation methods 130 used differ. The evaluation method with the ToF camera 41 comprises the steps of determining 132 a distance D1 from the arm rest 21 to the arm 11 along the vehicle axis FA as an x-coordinate; the detecting 134 of an x-coordinate XE with maximum change of slope in a function of the distance D1 over the x-coordinate as first x-coordinate XE; and the associating 136 of the first x-coordinate X1 with the position of the elbow EP. Thus, the elbow position EP is determined here. The method further comprises the step of measuring 138 a length L at least of the forearm 11*u* including the hand 11*h* and the estimating 140 of the hand position HP from the measured length L and a length ratio between the forearm 11*u* and the hand 11*h* stored in the data storage of the control unit 6. Thus, the hand position is also determined, according to which the step of moving 150 can be performed. The alternative evaluation method to this, with a dual camera system 42, comprises the steps of capturing 142 at least the wrist 11*g* and the elbow 11*e*, preferably also the shoulder, as reference points; the determining 144 of a depth information by moving the reference points captured in different images by the dual camera system 42; and the calculating 146 of positions of the reference points in relation to the arm rest 21 on the centre console 2 using a predetermined coordinate system, at least as the elbow position EP and the hand position HP. Thus, the elbow and hand position EP, HP is also determined, according to which the step of moving 150 can be performed.

Figure 5:
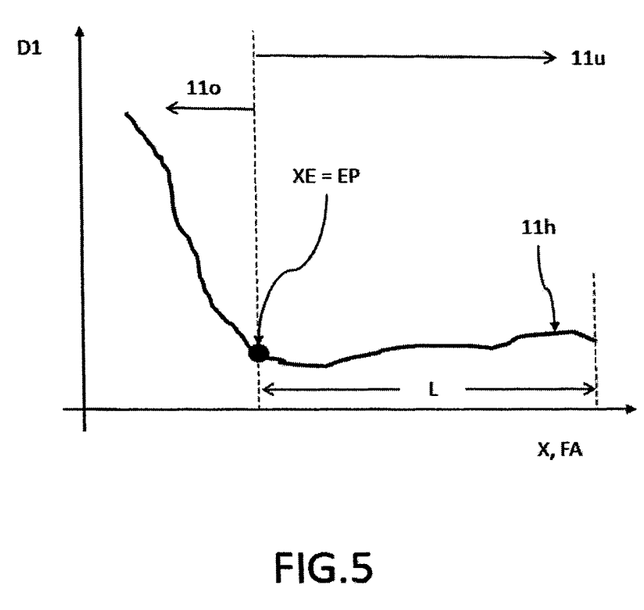
FIG. 5 shows an example for the evaluation of the distance of the arm to the arm rest as a function of the x-coordinate in the direction of the vehicle axis for determining the elbow position.

FIG. 5 shows an example for the distance D1 of the arm 11 in relation to the arm rest 21 as a function of the x-coordinate in the direction of the vehicle axis FA for determining the elbow position EP by means of a ToF camera 41. The distance D1 between the arm rest 21 and the forearm 11u is the respective vertical distance between the arm rest 21 and the arm 11 for a plurality of different points along the arm 11 from the hand 11h up to the end of the area of the arm 11 above the arm rest 21 that can be seen by the ToF camera 41. These distances D1 are entered as a function of the position along the arm rest 21, here described as the x-coordinate. In the area of the forearm 11u, the distance D1 is usually small, and only fluctuates slightly along the forearm 11u, while the distance D1 on the other side of the elbow 11e along the upper arm 11o becomes continuously larger. The elbow 11e is the transition point from the small slope to a large slope in the distance D1 over the x-coordinate, so that on the elbow 11e, the largest change of the slope for this function emerges. Accordingly, this x-coordinate XE is associated with the elbow position EP. This type of evaluation is easy to perform and delivers sufficiently reliable results for moving the arm rest 21. The distance from the elbow EP, XE at the start of the arm is determined as the length L, from which the precise hand position is determined according to a predetermined forearm-hand ratio. Here, the start of the arm always lies in the direction of the dashboard and is thus not interchangeable with the opposite end of the arm.

Figure 6:
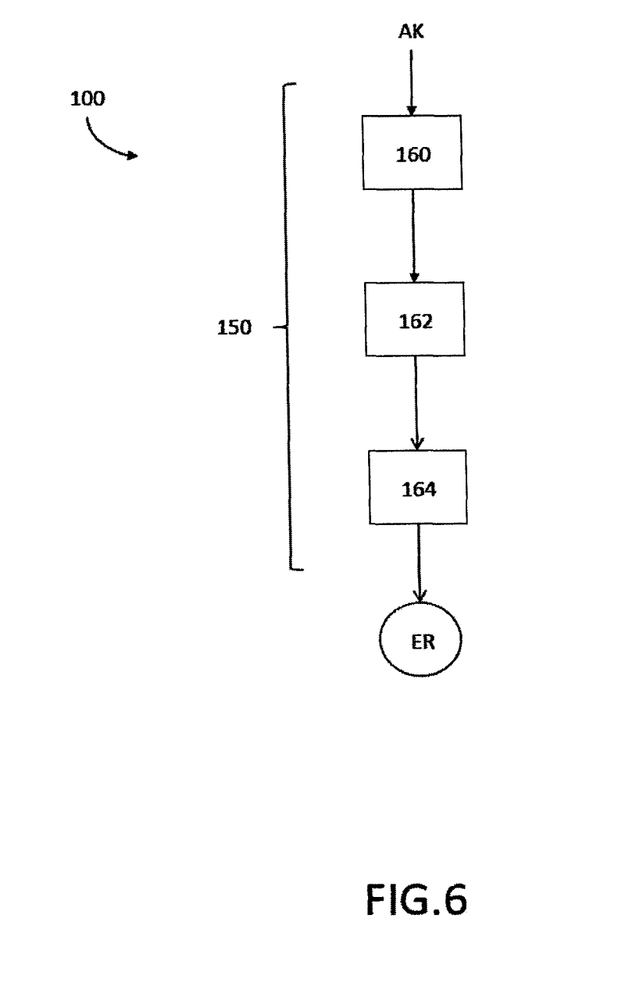
FIG. 6 shows a schematic view of an embodiment of the method according to the invention with action-controlled initiation of the automatic moving of the arm rest.

FIG. 6 shows a schematic view of an embodiment of the method 100 according to the invention, said embodiment having action-controlled initiation of the automatic moving 150 of the arm rest, wherein initiation occurs through a specific action AK of the driver 10 or another vehicle passenger 10b, for example a gesture or an operation of a switch or a button. In the case of activation via a gesture, the method 100 can comprise the following steps of moving 160 the arm rest 21 into a lower vertical limit stop; holding 162 the arm 11 at a desired height; and moving 164 the arm rest 21 in the vertical direction VR upwards, until the elbow 11e rests on the arm rest 21.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

LIST OF REFERENCE NUMERALS

1 Vehicle according to the invention
1i Vehicle interior
1s Side door of the vehicle
2 Centre console
21 Arm rest of the centre console
211 First arm rest on the driver's side
212 Second arm rest on the front passenger's side
22 Operating elements of the centre console
3 Positioning unit
4 Optical sensors
41 ToF camera
42 Dual camera system
5 Pressure sensor
6 Control unit
61 Data line
7 Switch or button
8 Dashboard
10 Driver of the vehicle
10b Other vehicle occupants, e.g. passenger
11 Arm of the driver
11e Elbow of the driver
11g Wrist of the driver
11h Hand of the driver
11o Upper arm of the driver
11u Forearm of the driver
100 Method according to the invention
110 Detection of an arm of the driver
120 Determining an elbow position and a hand position of the arm
130 Evaluation method
132 Determining a distance from the arm rest to the lower and upper arm
134 Detecting a first x-coordinate with maximum change of slope in a function of the distance over the x-coordinate
136 Associating the first x-coordinate with the position of the elbow
138 Measuring a length at least of the lower arm, including the hand
140 Estimating the hand position from the measured length and a predetermined length ratio between the forearm and the hand
142 Capturing the wrist and elbow as reference points
144 Determining a depth information by moving the reference points
146 Calculating positions as reference points as elbow and hand position
150 Automatic moving of the arm rest by means of the positioning unit, for example action-triggered moving of the arm rest
152 Moving the arm rest parallel to the vehicle axis
154 Moving the arm rest in the vertical direction
160 Moving the arm rest in a lower vertical limit stop
162 Holding the arm at a desired height
164 Moving the arm rest in the vertical direction upwards
AD Contact pressure of the arm on the arm rest
AK Action of the driver of another vehicle passenger
D1 Distance from the arm rest to the forearm and to the upper arm
EP Elbow position
ER Ergonomic position of the arm
FA Vehicle axis
HP Hand position
MVD Minimum resting time of the forearm on the arm rest
SD Sensor data
SW Threshold value
VK Vertical direction
W Warning message or warning tone
X1 First x-coordinate (maximum change of slope)

What is claimed is:

1. A method for setting an ergonomic position of an arm rest of a center console with one or more operating elements separate from the arm rest in a vehicle, wherein at least the arm rest is movably mounted, using a positioning unit, at least vertically as well as horizontally, comprising:

detecting an arm of a driver including detecting a forearm and at least areas of an upper arm of the driver using one or more optical sensors;

determining at least an elbow position and a hand position of the arm of the driver using sensor data of the one or more optical sensors by means of an evaluation method; and automatically moving the arm rest of the centre console using the positioning unit based on the determined elbow position and the determined hand position at least vertically as well as horizontally so that after moving the arm rest a predetermined position of the arm is achieved.

2. The method according to claim 1, wherein the ergonomic position is achieved in response to the elbow resting on the arm rest of the centre console and the hand being in the area of the one or more operating elements of the centre console.

3. The method according to claim 1, wherein the one or more optical sensors comprise one or more ToF cameras.

4. The method according to claim 3, wherein the evaluation method for determining the elbow position using the ToF camera comprises:

determining a distance from the arm rest to the arm along the vehicle axis as an x-coordinate;

detecting an x-coordinate with maximum change of slope in a function of a distance via the x-coordinate as the first x-coordinate; and associating of the first x-coordinate with the position of the elbow.

5. The method according to claim 3, wherein the evaluation method for determining the hand position using the ToF camera comprises:

measuring a length at least of a forearm including a hand; and estimating the hand position from the measured length and a predetermined length ratio between the forearm and the hand.

6. The method according to claim 1, wherein the one or more optical sensors comprise a dual camera system, the dual camera system comprising two cameras arranged close to each other for capturing three-dimensional spatial data.

7. The method according to claim 6, wherein the evaluation method for determining the elbow and hand positions using the dual camera comprises:

capturing at least a wrist, an elbow, and a shoulder of the driver, as reference points;

determining depth information by means of displacing the reference points in different images captured by the dual camera system; and calculating positions of the reference points in relation to the arm rest of the centre console using a predetermined coordinate system at least as the elbow position and hand position.

8. The method according to claim 1, wherein moving the arm rest of the centre console comprises:

moving the arm rest first parallel to the vehicle axis into the corresponding position below the arm so that the hand is in the area of the operating elements when the arm rests on the arm rest; and moving the arm rest in a vertical direction until the forearm rests on the arm rest.

9. The method according to claim 8, wherein the moving of the arm rest parallel to the vehicle axis is performed in a lower vertical limit stop of the arm rest.

10. The method according to claim 1, wherein the moving of the arm rest in the vertical direction upwards by means of a pressure sensor and a corresponding control unit is ended as soon as a contact pressure of the arm exceeds a predetermined threshold value between 10N and 50N.

11. The method according to claim 1, wherein the automatic moving is only performed after a predetermined minimum resting time of the forearm on the arm rest has been exceeded.

12. The method according to claim 1, wherein the automatic moving is initiated by a certain action of the driver or another vehicle passenger comprising a gesture, an operation of a switch or a button.

13. The method according to claim 12, wherein the initiated automatic moving comprises:

moving the arm rest into a lower vertical limit stop;

holding the arm at a desired height; and moving the arm rest upwards in the vertical direction until the elbow rests on the arm rest.

14. The method according to claim 1, wherein the detecting, the determining, and the automatically moving are configured to be deactivated from the vehicle interior.

15. The method according to claim 1, wherein during the moving in the vehicle, a warning message is displayed or a warning tone is emitted.

16. The method according to claim 1, wherein the arm rest of the centre console is a two-part arm rest that is divided into a first arm rest on a driver's side and a second arm rest on a front passenger side, and the method is performed independently both for setting the predetermined arm position for the driver and another predetermined arm position for the front passenger.

17. A vehicle, comprising:

a centre console with an arm rest for resting an arm of a driver and with one or more operating elements separate from the arm rest, wherein at least the arm rest is movably mounted by means of a positioning unit at least vertical as well as horizontally;

one or more optical sensors for detecting the arm of the driver including detecting a forearm and at least areas of an upper arm of the driver, and a control unit connected to the one or more optical sensors and the positioning unit via data lines, wherein the vehicle is configured to perform a method according to claim 1 via corresponding triggering of the positioning unit.

18. The vehicle according to claim 17, wherein the optical sensors comprise at least one of a ToF camera and a dual camera system.

19. The vehicle according to claim 18, wherein at least one of the ToF camera and the dual camera system is arranged in a side door of the vehicle.

20. The vehicle according claim 17, further comprising a pressure sensor integrated in the arm rest to determine whether a contact pressure of the arm exceeds a predetermined threshold value between 10N and 50N.

21. The vehicle according to claim 17, wherein at least one of the one or more optical sensors is configured and suitably arranged to detect certain actions of the driver or another vehicle passenger.

22. The vehicle according to claim 17, wherein at least one of a dashboard and the centre console or other areas in the vehicle for an operation are configured to deactivate the moving of the arm rest or to display a warning message in the vehicle or to emit a warning tone during moving of the arm rest.

23. The vehicle according to claim 17, wherein the arm rest of the centre console is a two-part arm rest that is divided into a first arm rest on a driver's side and a second arm rest on a front passenger side, the first and second arm rest are configured to be moved by the positioning unit independently of each other, and the control unit is configured to set the predetermined arm position both for the driver and another predetermined arm position for the front passenger independently of each other.

* * * * *